United States Patent [19]
Watts

[11] Patent Number: 5,938,849
[45] Date of Patent: Aug. 17, 1999

[54] CEMENT LINING SLINGER HEAD TACHOMETER ASSEMBLY

[76] Inventor: Kenneth J. Watts, 2427 Burgundy Dr., Jefferson County, Ala. 35244

[21] Appl. No.: 09/127,521

[22] Filed: Jul. 31, 1998

[51] Int. Cl.[6] ........................................... B05C 7/00
[52] U.S. Cl. ................. 118/712; 118/306; 118/317; 118/323; 427/230; 427/236; 427/8
[58] Field of Search ..................... 118/306, 317, 118/323, 712; 427/230, 236, 8

[56] References Cited

U.S. PATENT DOCUMENTS

| | | |
|---|---|---|
| 3,327,681 | 6/1967 | Hortvet . |
| 3,719,168 | 3/1973 | Kazee . |
| 4,361,288 | 11/1982 | Fukuda et al. . |
| 4,499,118 | 2/1985 | Dietz et al. . |
| 4,502,853 | 3/1985 | Ohi . |
| 4,936,507 | 6/1990 | Weinstein . |
| 5,141,774 | 8/1992 | Prittinen et al. . |
| 5,697,559 | 12/1997 | Davis et al. . |

*Primary Examiner*—Laura Edwards
*Attorney, Agent, or Firm*—A. W. Fisher, III

[57] ABSTRACT

A cement lining slinger head tachometer device to detect and display the speed of rotation of a slinger head when lining the inner surface of a pipe with cement including a cement supply to feed cement from an external source to the slinger head, a slinger head drive to rotate the slinger head and a system control to monitor and display the rotational speed of the slinger head.

12 Claims, 5 Drawing Sheets

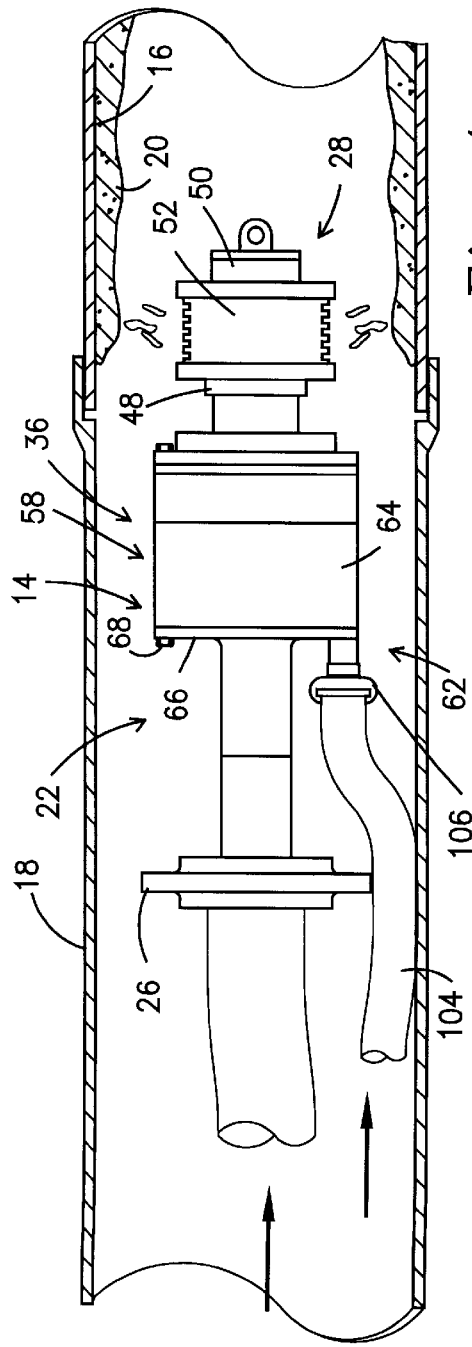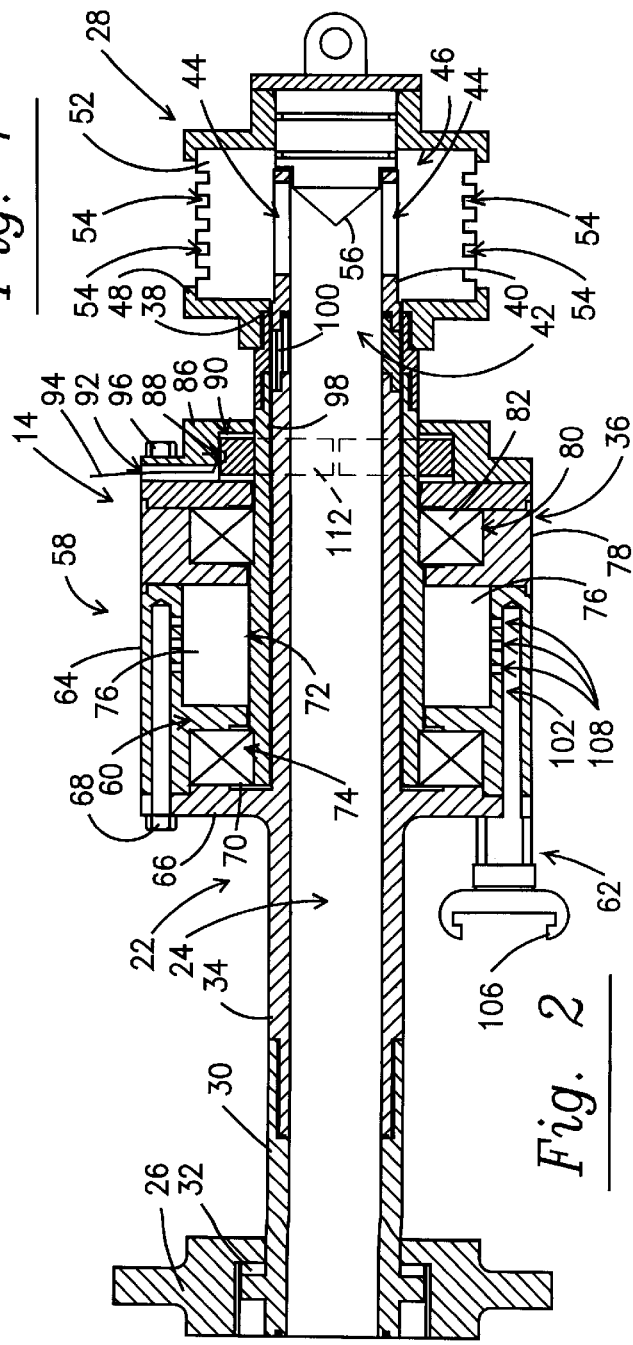
Fig. 1
Fig. 2

CEMENT LINING SLINGER HEAD TACHOMETER ASSEMBLY

BACKGROUND OF THE INVENTION

1. Field of the Invention

A cement lining slinger head tachometer device to detect and display the speed of rotation of a slinger head when lining the inner surface of a pipe with cement.

2. Description of the Prior Art

A cement lining is added to the inside surface of iron pipe to protect the iron and to improve the flow characteristics of the pipe.

Problems arise when the slinger head does not spin at the proper speed necessary to evenly and uniformly apply the cement mixture. This can be due to wear over the course of normal use or improper adjustment.

U.S. Pat. No. 4,502,853 discloses a rotational speed sensor for sensing the rotational speed of an aluminum alloy rotor having a permanent magnet embedded therein.

U.S. Pat. No. 4,361,288 teaches a rotating speed detecting device comprising an annular permanent magnet attached to the rotary shaft of a spray painting device and a detecting head mounted on the housing of the spray painting device to measure the speed of rotation of the rotary shaft.

JP 62-25267 relates to a magnetic signal generator ring comprising a resin magnet embedded in the outer peripheral surface of the ring fabricated of synthetic resin to form the magnetic signal generator ring.

U.S. Pat. No. 5,697,559 shows a rotary atomizer including a speed sensing system mounted in the atomizer housing utilizing both magnetics and optics for accurately measuring the rotational speed of the air turbine motor in the presence of high electrostatic charge and RF fields from an internal power supply.

U.S. Pat. No. 4,936,507 shows a speed monitoring device for the rotary atomizer. A pair of permanent magnets are mounted at diametrically opposed locations on the turbine wheel. Although one magnet is sufficient to generate a speed signal, two or more magnets are typically utilized to maintain the balance of the turbine wheel. A pickup coil including a magnetic core is located adjacent the path of the magnet. The ends of the pickup coil are connected to opposite ends of a single loop of dielectrically insulated high voltage wire in a series loop. The high voltage wire extends through an aperture formed in the end cover and through the aperture formed in the manifold body. Each time one of the magnets passes the pickup coil, an electrical pulse is generated in the coil and conducted through the high voltage wire. The pulse is inductively coupled to the torodial coil and sensed by the speed monitoring device.

U.S. Pat. No. 3,719,168 comprises a system for dispensing and applying a uniform layer of liquid or flowable material. The system includes a distributor unit from which droplets of the material can be propelled by centrifugal force, and means are provided for spinning the distributor unit at relatively high rpms. The distributor unit includes a cylindrical chamber into which flowable material is received for distribution therefrom and the cylindrical chamber includes annular channels associated with spaced rows of openings which penetrate the wall of the cylindrical chamber. The system is especially useful for coating lining compounds or interior surfaces of pipes.

U.S. Pat. No. 4,499,118 shows a method of applying a coating of atomizable material to the inside surface of a glass tube comprising positioning a rotatable member within the tube, delivering the material to a surface of the member adapted to receive the material, and rotating the member at a predetermined velocity to atomize the material and impact the surface of the tube with at least a portion of the atomized material. A potential difference may be established between the atomized material and the surface of the tube to improve coating efficiency. The surface of the tube may be maintained at an electrical potential, and multiple coatings may be produced.

U.S. Pat. No. 5,141,774 discloses an apparatus for coating the inner wall or surface of hollow objects utilizing centrifugal force to apply fluid to the object. A probe is moved from underneath the object thereby utilizing gravitational forces to prevent spillage of the material from the probe. A computer controls the pumping rate, the vertical movement of the probe and the rotational speed of the probe to allow the machine to precisely coat a band on the internal cavity of an article.

U.S. Pat. No. 3,327,681 is directed to a improved boom mounting and rotary head for application of uniform coating of epoxy resins paints or other suitable coating material to tubular members. A rotary head drive and control unit are secured to the forward end of a stabilizing unit. The boom serves as a conduit for air lines, hydraulic and electrical control lines as well as the line for carrying the coating material to the rotary head. The various controls are mounted within the rotary head drive and control unit including a constant torque variable speed hydraulic motor which is coupled to drive the rotary head unit provided on the forward end of the drive and control unit. The speed of the motor is regulated through a flow control valve which is mounted on the hydraulic power unit located adjacent to the machine.

FR 2 305 245 shows an apparatus to apply enamel to the internal tube wall by a projector operating during the extrusion process. The projector is a variable speed rotary disc on the mandrel to which the enamel is delivered.

The present invention is directed to the device used to deliver the lining or coating of cement to the interior of the pipe. As a length of iron pipe moves through the foundry line, a slinger head is positioned in the pipe to deliver the cement. The slinger head is hollow with openings through which the cement is forced under centrifugal force. An air source is used to spin the slinger head as it moves the length of the pipe spraying cement on the prior pipe wall.

SUMMARY OF THE INVENTION

The present invention relates to a cement slinger head tachometer device comprising a sensor means and a system control means for use with a slinger head assembly to line or coat the interior surface of a pipe with cement.

The slinger head assembly comprises a cement supply conduit having a feed passage formed therethrough coupled to a source of cement and a slinger head to receive cement from the cement supply conduit for distribution to the interior surface of the pipe.

The slinger head comprises an interior cement conduit having a slinger passage formed therethrough terminating in a plurality of feed orifices in fluid communication with a feed chamber and a plurality of feed apertures to distribute cement to the interior surface of the pipe through the plurality of feed apertures.

A slinger head drive means comprising a turbine housing to operatively house a turbine is coupled to the slinger head to rotate the slinger head and in fluid communication with an air source through an air supply means to power the turbine.

The sensor means comprises a first sensor element including means to generate a signal when energized attached to the slinger head coupled to the system control means and a second sensor element including means to energize the first sensor element when in proximity thereto affixed to the turbine housing.

The system control means includes means to convert signals received from the first sensor element into a visual display representative of the speed of rotation or revolutions per minute of the second sensor element and the slinger head relative to the first sensor element.

In operation, the slinger head assembly with the turbine and slinger head rotating at the predetermined rotational speed is advanced into and withdrawn from the pipe coating the interior surface of pipe with cement fed from the source of cement (not shown) through slinger head assembly out the feed apertures by centrifugal force.

As previously discussed, the system control means will monitor the rotational speed of turbine and slinger head to maintain and control the rotational speed of the turbine and slinger head at the predetermined speed through the feedback loop as well as provide a visual display on display.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 1 is a top view of a cement feed and a slinger head assembly with the cement lining slinger head tachometer device of the present invention.

FIG. 2 is a cross-sectional side of a cement feed and a slinger head assembly with the cement lining slinger head tachometer device of the present invention.

Similar reference characters refer to similar parts throughout the several views of the drawings.

DETAILED DESCRIPTION OF THE PREFERRED EMBODIMENT

Figure 3:
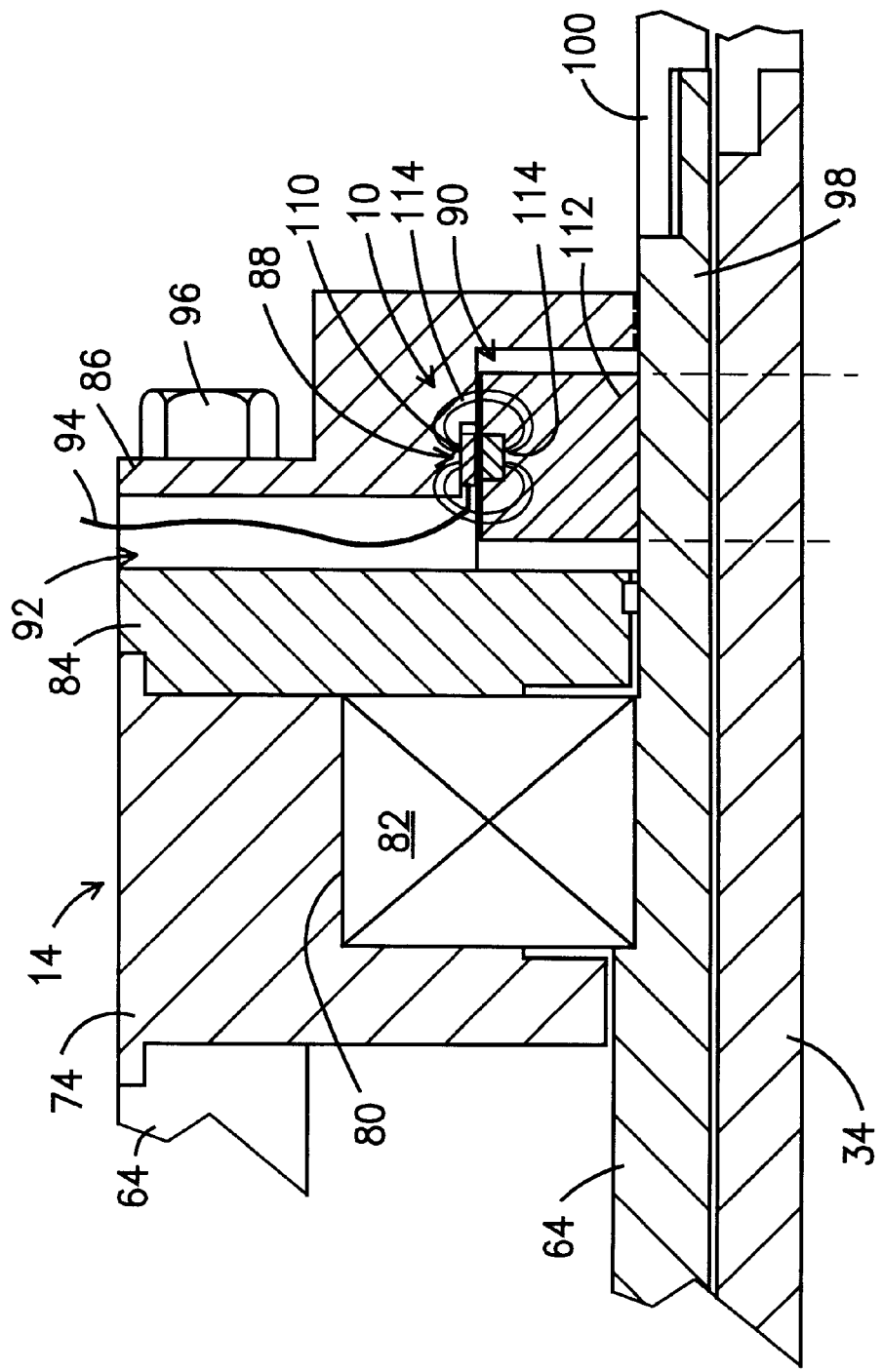
FIG. 3 is a detailed cross-sectional side view of the sensor means of the present invention.
Figure 4:
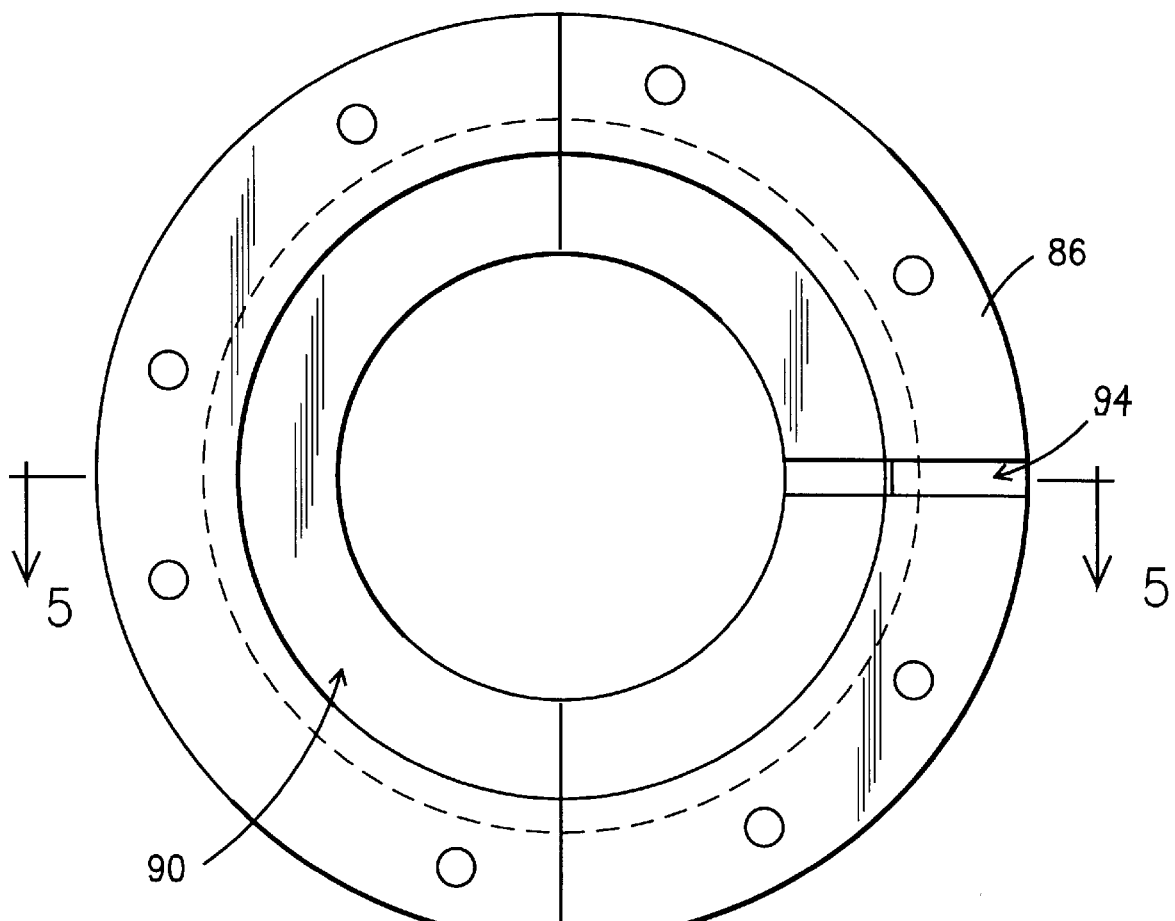
FIG. 4 is a side view of the magnet ring of the present invention.
Figure 5:
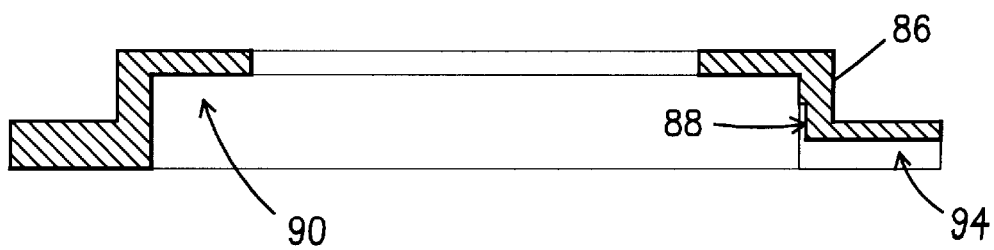
FIG. 5 is a cross-section front end view of the magnet ring of the present invention taken along line 5—5 of FIG. 4.
Figure 6:
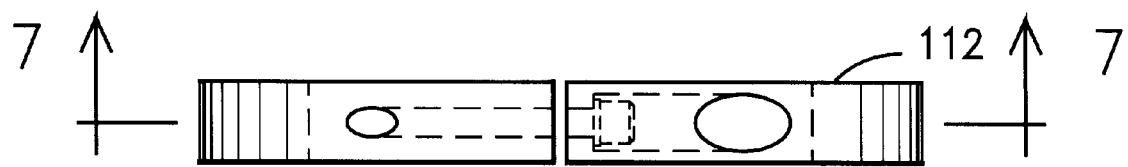
FIG. 6 is a front end view of the sensor bracket of the present invention.
Figure 7:
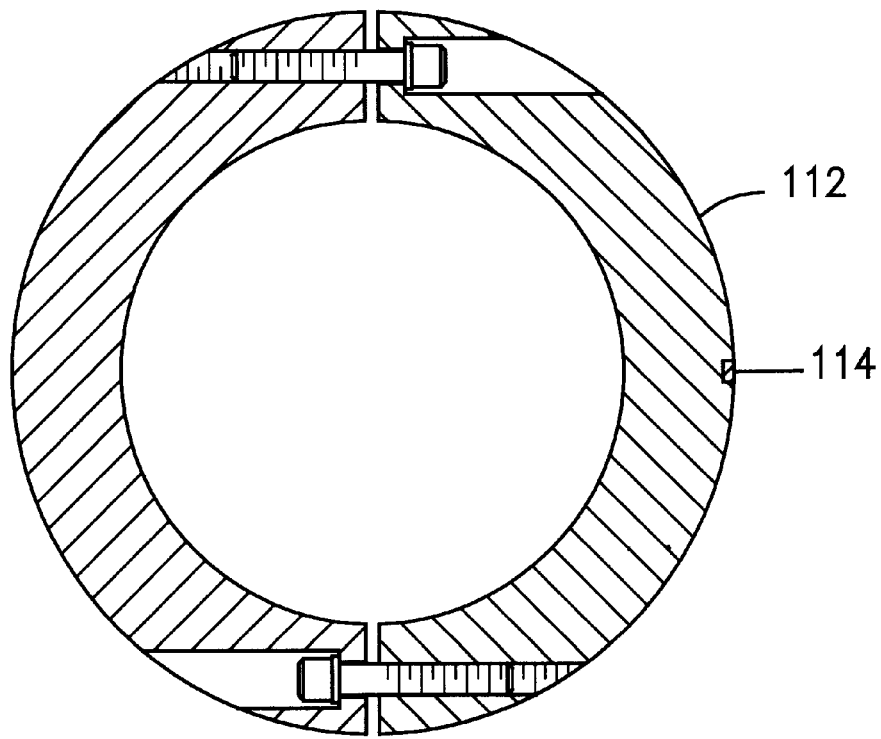
FIG. 7 is a cross-sectional side view of the sensor bracket of the present invention taken along line 7—7 of FIG. 6.
Figure 8:
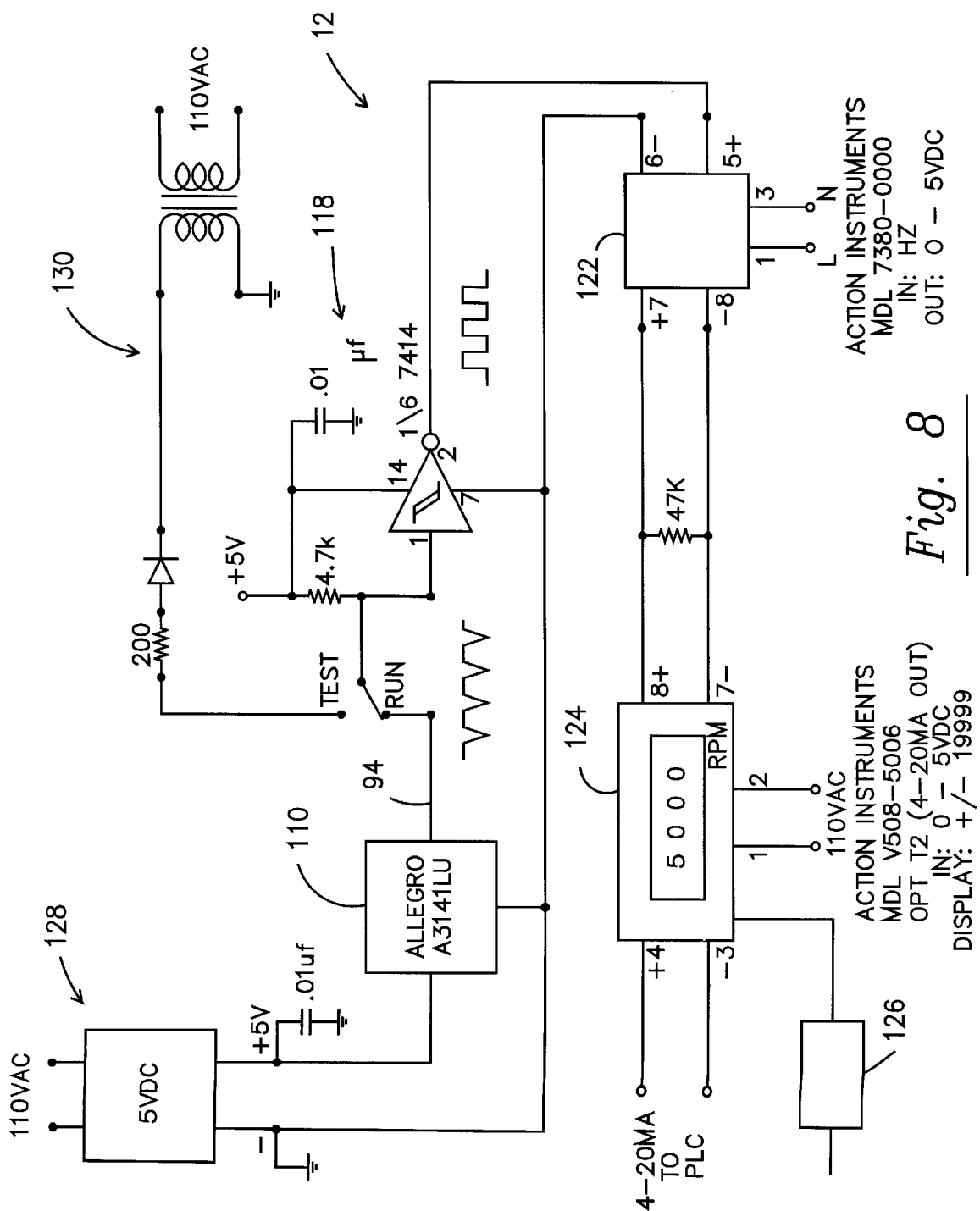
FIG. 8 is a schematic diagram of the system control means of the present invention.

The present invention relates to a cement slinger head tachometer device comprising a sensor means generally indicated as 10 in FIG. 3 and a system control means generally indicated as 12 in FIG. 8 for use with a slinger head assembly generally indicated as 14 in FIGS. 1 and 2 to line or coat the interior surface 16 of a pipe 18 with cement 20.

As shown in FIGS. 1 and 2, the slinger head assembly 14 comprises a cement supply conduit generally indicated as 22 having a feed passage 24 formed therethrough coupled to a source of cement (not shown) by a cement supply conduit coupler 26 and a slinger head generally indicated as 28.

As best shown in FIG. 2, the cement supply conduit 22 comprises an inner supply conduit section 30 attached in sealed relationship relative to the cement supply conduit coupler 26 by a seal 32, an intermediate supply conduit section 34 configured to operatively support a slinger head drive means generally indicated as 36 and the sensor means 10 as described more fully hereinafter, and an outer supply conduit section 38 to distribute the cement 20 to the interior surface 16 of the pipe 18 as more fully described hereinafter.

As shown in FIGS. 1 and 2, the slinger head 28 comprises an interior cement conduit 40 having a slinger passage 42 formed therethrough terminating in a plurality of feed orifices each indicated as 44 formed in the side wall of the interior cement conduit 40 in fluid communication with a feed chamber 46 formed between an inner and outer end plate or member 48 and 50 respectively and a feed chamber plate 52 having a plurality of feed apertures each indicated as 54 formed therethrough. A cement directional control member or cone shaped element 56 is disposed in the outer end portion of the slinger passage 42 to direct the cement 20 through the plurality of feed orifices 44 to the feed chamber 46 for distribution to the interior surface 16 of the pipe 18 through the plurality of feed apertures 54.

As shown in FIGS. 1 and 2, the slinger head drive means 36 comprises a turbine housing generally indicated as 58 to operatively house a turbine generally indicated as 60 therein coupled to the inner end plates or members 48 of the slinger head 28 and in fluid communication with an air source (not shown) through an air supply means generally indicated as 62. The turbine housing 58 comprises a substantially cylindrical housing member 64 affixed to the intermediate supply conduit section 34 of the cement supply conduit 22 by a flange 66 and a bolt 68 or other suitable fastening means and having an inner bearing groove 70 formed on the inner end portion thereof and a turbine blade groove or recess 72 formed on the outer end portion thereof to operatively house an inner bearing 74 therein and a plurality of turbine blades each indicated as 76, a substantially cylindrical intermediate housing plate or member 78 including an outer bearing recess means 80 formed in the outer surface thereof to operatively house an outer bearing 82 therein a substantially cylindrical outer housing plate 84 and a sensor bracket 86 including a first sensor element recess 88 and a second sensor element recess 90 to operatively house the sensor means 10 as described hereinafter and a conductor passage 92 formed therethrough to receive a sensor conductor 94 as described more fully hereinafter are affixed to the outer end portion of the substantially cylindrical housing member 64 by a bolt 96 or other suitable fastening means. A turbine housing extension 98 extends forward to be affixed to the inner end plate 48 of the slinger head 28 by a substantially cylindrical interconnecting member or coupler 100.

As shown in FIGS. 1 and 2, the air supply means 62 comprises an air passage 102 formed in the substantially cylindrical housing member 64 of the turbine housing 58 connected to an air source (not shown) by an air house 104 by an air coupler 106 and a plurality of air apertures each indicated as 108 formed in the substantially cylindrical housing member 64 of the turbine housing 58 and in open fluid communication with the turbine blade groove or recess 72.

As best shown in FIGS. 2 through 7, the sensor means 10 comprises a first sensor element 110 such as a Hall Effect semiconductor disposed within the first sensor element recess 88 of the sensor bracket 86 coupled to the system control means 12 by the conductor 94 and a second sensor element 112 such as a ring of nonferrous material having a magnet 114 embedded therein affixed to the turbine housing extension 98 of the substantially cylindrical housing member 64. As best shown in FIG. 3, an expanded magnetic field 116 radiates outward the magnet 114.

As shown in FIG. 8, the system control means 12 comprises a trigger circuit generally indicated as 118 including a trigger 120 such as a 7414 Hex Inverter Schmitt Trigger to convert the sensor signals received from the first sensor element 110 of the sensor means 10 to a square wave, a frequency to voltage converter 122 such as Action Instruments MDL 7380-0000 to convert the square wave frequency to a corresponding voltage valve and a voltage to revolution per minute converter and display 124 such as an Action Instruments MDL V508-5006 to convert the voltage valve to a corresponding revolution per minute and to display the RPM of the second sensor element 112 and the slinger head 28 relative to the first sensor element 110.

In addition, the output of the voltage to revolution per minute converter and display 124 is fed to a comparator 126 which includes logic means to determine whether the rotational speed of the turbine 60 and the slinger head 28 is above or below a predetermined valve such as 5000 RPM and to generate a control signal in response thereto to increase or decrease air pressure from the air source (not shown) to either increase or decrease the rotational speed of the turbine 60 and slinger head 28 to the predetermined speed such as 5000 RPM.

The first sensor element 110 is coupled to 110VAC through an AC to DC converter generally indicated as 128. Further, the system control means 12 may include a test circuit generally indicated as 130.

In operation, the slinger head assembly 14 with the turbine 60 and slinger head 28 rotating at the predetermined rotational speed is advanced into and withdrawn from the pipe 18 coating the interior surface 16 of pipe 18 with cement 20 fed from the source of cement (not shown) through slinger head assembly 14 out the feed apertures 54 by centrifugal force.

AS previously discussed, the system control means 20 will monitor the rotational speed of turbine 60 and slinger head 28 to maintain and control the rotational speed of the turbine 60 and slinger head 28 at the predetermined speed through the feedback loop as well as provide a visual display on display 124.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A slinger head assembly comprising a slinger head, a cement supply to feed cement from an external source to said slinger head, a slinger head drive operatively coupled to rotate said slinger head and a slinger head tachometer device including a sensor means to sense rotational speed of said slinger head and to produce sensor signals in response thereto and a system control means having means to receive said sensor signals from said sensor means and to display the rotational speed of said slinger head when lining an inner surface of a pipe with cement.

2. The slinger head assembly of claim 1 wherein said slinger head includes an interior cement conduit having a slinger passage formed therethrough terminating in a plurality of feed orifices formed in the side wall of the interior cement conduit in fluid communication with a feed chamber formed therein, said slinger head drive means further including a turbine housing to operatively house a turbine coupled to said slinger head and in fluid communication with an air source through an air supply means.

3. The slinger head assembly of claim 2 wherein said sensor means comprises a first sensor element coupled to the turbine housing coupled to the system control means by the conductor and a second sensor element coupled to said turbine disposed in operative relationship relative to said first sensor element.

4. The slinger head assembly of claim 3 wherein said first sensor element comprises a semiconductor and said second sensor element comprises a sensor member having a magnet affixed thereto.

5. The slinger head assembly of claim 4 wherein said sensor member comprises a ring of nonferrous material and said magnet radiates an expanded magnetic field therefrom.

6. The slinger head assembly of claim 4 wherein said system control means comprises means to convert said sensor signals received from said first sensor element to generate a display signal corresponding to the rotational speed of said second sensor element and said slinger head relative to said first sensor element and to display the rotational speed on a display device.

7. The slinger head assembly of claim 4 wherein said system control means further includes logic means to determine whether the rotational speed of said turbine and said slinger head is above or below a predetermined value and to generate a control signal in response thereto to increase or decrease air pressure from the air source to either increase or decrease the rotational speed of said turbine and said slinger head to the predetermined speed.

8. The slinger head assembly of claim 2 wherein said system control means further includes logic means to determine whether the rotational speed of said turbine and said slinger head is above or below a predetermined valve and to generate a control signal in response thereto to increase or decrease air pressure from the air source to either increase or decrease the rotational speed of said turbine and said slinger head to the predetermined speed.

9. The slinger head assembly claim 8 wherein said sensor means comprises a first sensor element coupled to said turbine housing coupled to the system control means by the conductor and a second sensor element coupled to said turbine disposed in operative relationship relative to said first sensor element.

10. The slinger head assembly of claim 9 wherein said first sensor element comprises a semiconductor and said second sensor element comprises a sensor member having a magnet affixed thereto.

11. The slinger head assembly of claim 10 wherein said sensor member comprises a ring of nonferrous material and said magnet radiates an expanded magnetic field therefrom.

12. The slinger head assembly of claim 1 wherein said system control means further includes logic means to determine whether the rotational speed of said slinger head is above or below a predetermined value and to generate a control signal in response thereto to either increase or decrease the rotational speed of said slinger head to the predetermined speed.

\* \* \* \* \*